3,562,125
METHOD FOR THE RADIATION PRODUCTION OF FILMS FROM UNSATURATED POLYESTER RESINS
Rene Leopold Eduard Van Gasse, Schoten, Antwerp, Belgium, assignor to N.V. Chemische Industrie Synres, Hoek van Holland, Netherlands, a corporation of the Netherlands
Continuation of application Ser. No. 651,518, July 6, 1967. This application Feb. 24, 1970, Ser. No. 14,733
Claims priority, application Netherlands, July 8, 1966, 6609608
Int. Cl. B01j 1/10; C08f 1/00, 21/00
U.S. Cl. 204—159.15    3 Claims

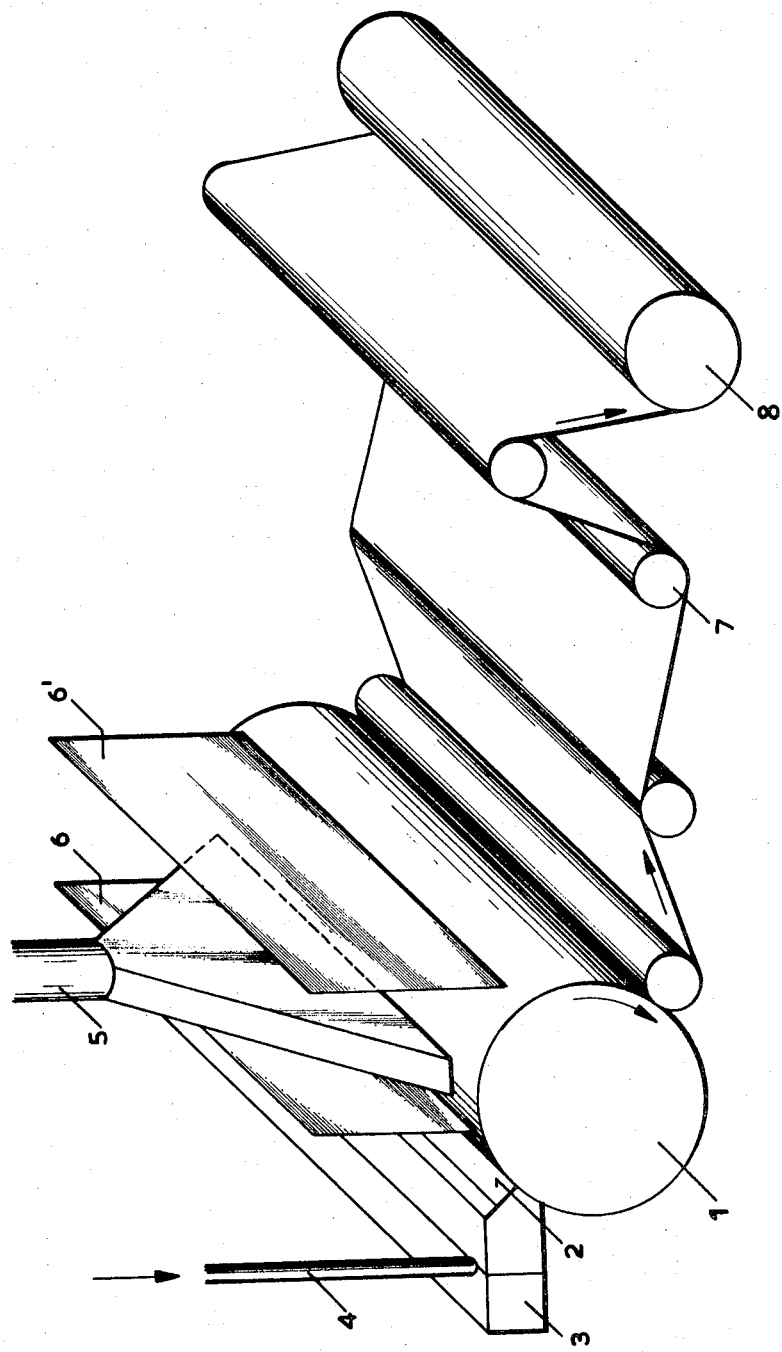

ABSTRACT OF THE DISCLOSURE

A method for the almost complete polymerization of unsaturated polyester resins in a very short time to produce films from such resins. The ratio of equivalence between unsaturated monomer and olefinically unsaturated bonds in the polyester chain ranges between 1.0 and 1.7. Polymerization is effected by radiation with high energy electrons, the radiant energy being higher than $1 \times 10^8$ erg/g./sec.

---

This application is a continuation of S.N. 651,518, filed July 6, 1967, now abandoned.

It is well-known that unsaturated polyester resins can be polymerized by means of peroxides, with metallic salts and/or amines being optionally added as accelerators.

However, the production of films by means of this polymerization method has not been applied on a large scale, because:

(a) The rate of polymerization is low. At temperatures of about 120° C. a minimum rate of polymerization of 30 seconds is required to obtain a degree of polymerization of 90%, said rate being as much as 10 minutes at room temperature. On account of this high rate of polymerization there is a great loss of unsaturated monomer, so that the quality does not come up to its standard.

(b) The presence of peroxides and accelerators gives rise to the formation of undesirable by-products, which adversely affect the quality of the film.

(c) The oxygen in the air has an inhibitive effect on the polymerization, so that films are obtained which do not have an adhesion-free surface, and additional steps are to be taken for the films to be wound up.

It is also known that unsaturated polyester resins can be polymerized under the influence of heat and/or light (in the absence of peroxides). This method is not suitable for the production of films either, because here, too, the rate of polymerization is low, and so is the degree of polymerization.

Finally it is known to polymerize unsaturated polyester resins by radiation with high energy electrons. However, it is a disadvantage of this method that one is bound by a specific maximum energy, owing to which one cannot increase the rate of polymerization at random, while the polymerization is incomplete. This is not in agreement with the high cost of investment of the apparatus. (See, e.g., British Pat. No. 762,953, wherein the radiant energy may not exceed $1 \times 10^6$ roentgen per second ($=0.84 \times 10^3$ erg/g./sec.).

The present invention provides a method by which almost complete polymerization of unsaturated polyester resins can be achieved in a very short time (within 5 seconds). For it has been found that the polyester chain contains a critical range for the equivalence ratio of unsaturated monomer/olefinically unsaturated bonds, within which it is possible to effect polymerization at an energy in excess of $1 \times 10^6$ roetgen per second, as a result of which very high rates of polymerization can be obtained and also a degree of polymerization higher than 90%.

This critical ratio of equivalence ranges between 1.0 and 1.7. Accordingly, the invention relates to a method for the production of films from unsaturated polyester resins in which the ratio of equivalence between the unsaturated monomer and the olefinically unsaturated bonds in the polyester chain ranges between 1.0 and 1.7, the polymerization being effected by radiation with high energy electrons at a dose of radiant energy which is in excess of $1 \times 10^8$ erg/g./sec.

In the polyester resins commercially available the ratio of equivalence between unsaturated monomer/unsaturated acid and/or unsaturated alcohol of which the polyester is made up is in general 2–2.5, for which reason they cannot be used for the method of this invention.

By unsaturated polyester resins are meant those resins obtained by polycondensation of dicarboxylic acids with bi-valent alcohols, said carboxylic acids and/or the alcohols containing, at least partially, $\alpha-\beta$ or $\beta-\gamma$ unsaturated bonds, such as maleic acid, fumaric acid, maleic acid anhydride, itaconic acid, butylenediol-1.4, butyndiol-1.4, which resins are capable of being cross-linked to form a tridimensional network because of the presence of a vinyl compound or acryl compound in which they are dissolved. Such vinyl compounds or acryl compounds are: styrene, vinyltoluene, vinyl acetate, diallyl phthalate, diallyl fumarate, methyl acrylate, methylmethacrylate, etc.

The dicarboxylic acids may partly be replaced with tricarboxylic acids or carboxylic acids of higher molecular weight. This also applies to the alcohols. Also, modification with monocarboxylic acids is possible.

The films can be manufactured in any suitable known manner. A preferred apparatus is shown in the accompanying drawing. The apparatus consist of a cylinder having a polished steel peripheral surface 1 onto which a layer of the polyester resin solution is drawn from the applying mechanism 2 in a thickness of 0.15 mm., with the cylinder rotating at a peripheral speed of 5 m./min. The mechanism 2 is disposed on a resin container 3 provided with a resin supply 4. Arranged above the cylinder is the electron accelerator 5, with shields 6 and 6' located on both sides of said accelerator to protect the reserve quantity of resin and the polymerized film from radiation. The final film is wound up by means of a holding and winding mechanism 7 and 8. The width of resin exposed to radiation is 10 cm. The total amount of absorbed energy is $7.5 \times 10^8$ erg/g., corresponding to a dosage rate of $6.25 \times 10^8$ erg/g./sec.

The invention will now be further illustrated with reference to the following examples.

EXAMPLE 1

An unsaturated polyester resin obtained from the esterification of 1 mole of phthalic acid anhydride and 1 mole of fumaric acid; 2.2 moles of propanediol-1.2, dissolved in 1.2 moles of styrene (and consequently the ratio of equivalence between styrene and olefinically unsaturated bonds in the polyester chain is 1.2) was applied onto a polished, stainless steel carrier at a thickness of 0.2 mm. and then radiated for 2.5 seconds with high energy electrons, in such a manner that the amount of energy was $3 \times 10^8$ erg/g./sec. The resulting film had a degree of polymerization of 93% and was sufficiently free of adhesion for it to be wound up.

If the film is subjected to an amount of energy which is absorbed for only $0.9 \times 10^8$ erg/g./sec., a degree of polymerization of 91% is reached only after 8 seconds, while the surface of the film is not free of adhesion.

EXAMPLE 2

An unsaturated polyester resin obtained from the esterification of 1 mole of isophtalic acid and 1 mole of maleic acid anhydride, 2.1 moles diethyleneglycol dissolved in 1.5 moles of styrene (and consequently the ratio of equivalence between styrene and olefinically unsaturated bonds in the polyester chain is 1.5) was applied onto a chromium plated and polished steel plate at a thickness of 0.1 mm., and this layer was then radiated with high energy electrons, in such a manner that $1\times 10^9$ erg/g./sec. was absorbed. The film turned out to be fully polymerized within 1 second.

If additional styrene is added to the above resin solution, so that the ratio of equivalence between styrene and olefinically unsaturated bonds in the polyester chain becomes 2, under the same conditions a degree of polymerization of only 55% is reached.

EXAMPLE 3

If the polyester resin of Example 1 is applied in a layer of 0.2 mm. onto a substrate of wood instead of a reflective layer of stainless steel or chromium plated brass, the amount of absorbed energy per g. per sec. is only about 70% as compared to that of a reflective carrier.

What is claimed is:

1. A process for producing a self-supporting film from an unsaturated polyester resin, said method comprising providing an unsaturated polyester resin including a vinyl monomer and in which the ratio of equivalence between the vinyl monomer and olefinically unsaturated bonds ranges between 1.0 and 1.7, applying said polyester resin in a relatively thin sheet to a smooth support, radiating said sheet with high energy electrons with a dose of radiant energy in excess of $1\times 10^8$ erg/g./sec. for less than 5 seconds to polymerize the polyester into a film having a polymerization degree of over 90% and stripping the polymerized film from the support.

2. A process according to claim 1 wherein the smooth support is an electron-reflective material.

3. A process according to claim 1 wherein the polyester resin is applied in a sheet of 0.1 to 0.2 mm. thickness.

References Cited

UNITED STATES PATENTS

| | | |
|---|---|---|
| 3,132,966 | 5/1964 | Hughes et al. _____ 204—159.15 |
| 3,247,012 | 4/1966 | Burlant. |

OTHER REFERENCES

Burlant et al., Radiation-Initiated Copolymerization of Styrene with Unsaturated Esters, Jrn. of Polymer Science, part A, vol. 2, pp. 2135–2149 (1964).

SAMUEL H. BLECH, Primary Examiner

R. B. TURER, Assistant Examiner

U.S. Cl. X.R.

260—861, 872